Jan. 26, 1965

T. E. LOHR 3,167,297

COMPOUND MOTION SEAT ADJUSTER

Filed June 8, 1962

INVENTOR.
Thomas E. Lohr
BY
J. L. Carpenter
ATTORNEY

INVENTOR.
Thomas E. Lohr

United States Patent Office 3,167,297
Patented Jan. 26, 1965

3,167,297
COMPOUND MOTION SEAT ADJUSTER
Thomas E. Lohr, Detroit, Mich., assignor to General Motors Corporation, Detroit, Mich., a corporation of Delaware
Filed June 8, 1962, Ser. No. 201,008
7 Claims. (Cl. 248—419)

This invention relates to vehicle seat adjusters and more particularly to a unit of a type which provides fore and aft motion combined with a tilting of the seat.

Seating requirements in an automobile vary from individual to individual. Therefore, it is desirable to provide a seat with a wide variety of positions to accommodate a greater majority of occupants.

An object of this invention is to provide a seat adjuster which will be adjustable horizontally and vertically along a compound curve. Another object of this invention is to furnish a seat adjuster which provides fore and aft movement during which the front of the seat moves in a substantially horizontal plane while the rear of the seat is lowered as the seat moves to the rear and raised as the seat is moved forward. A further object of this invention is to provide an inexpensive powered seat adjuster which will accommodate a greater number of people by providing vertical and horizontal adjustment simultaneously.

These and other objects, advantages and features of the invention will become more fully apparent as reference is had to the accompanying specification and drawings wherein.

It is to be understood that seat adjusters of this type are used in pairs and for ease of explanation only a left hand adjuster will be described. Where dual links are used for strength and have identical functions, the same reference numeral will be used.

Figure 1:
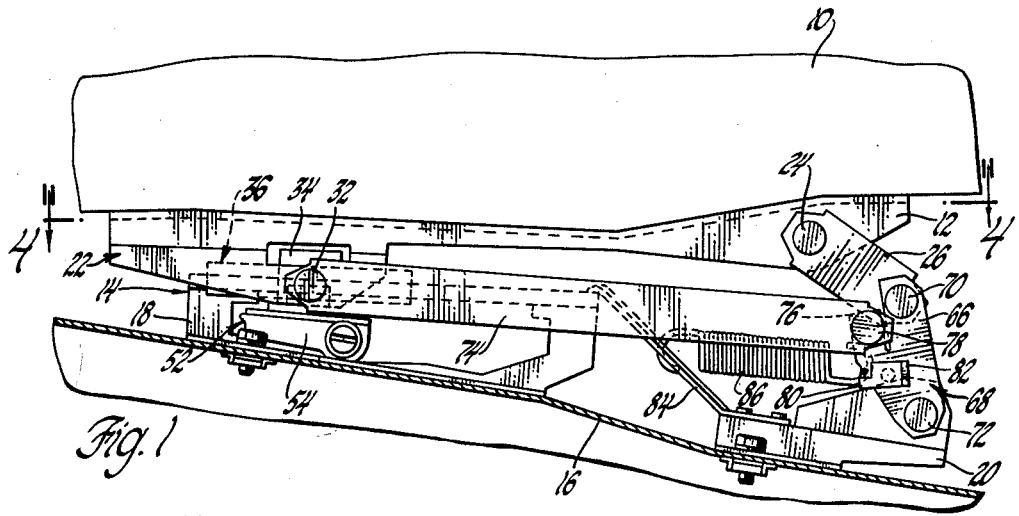
FIGURE 1 is a side elevational view, partially broken away, of the outboard side of the unique seat adjuster in the fully forward position having a seat supported thereon.
Figure 2:
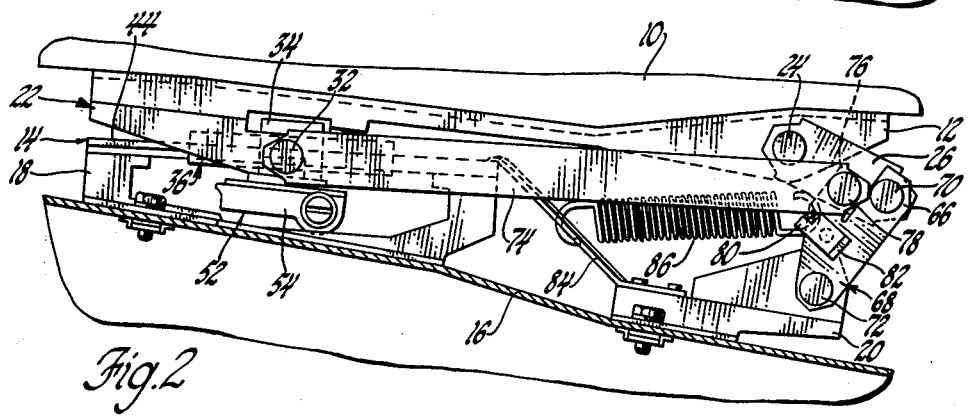
FIGURE 2 shows a side elevational view of the seat adjuster intermediate the extremes of travel.
Figure 3:
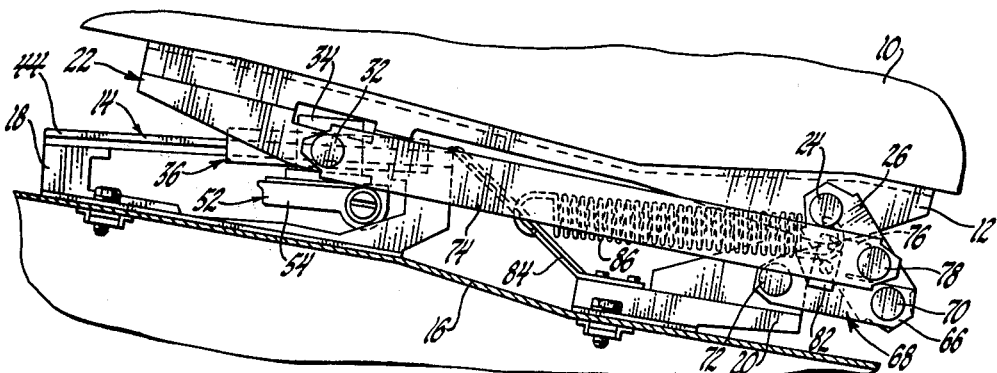
FIGURE 3 is a side elevational view of the seat adjuster in the extreme rear position.
Figure 4:
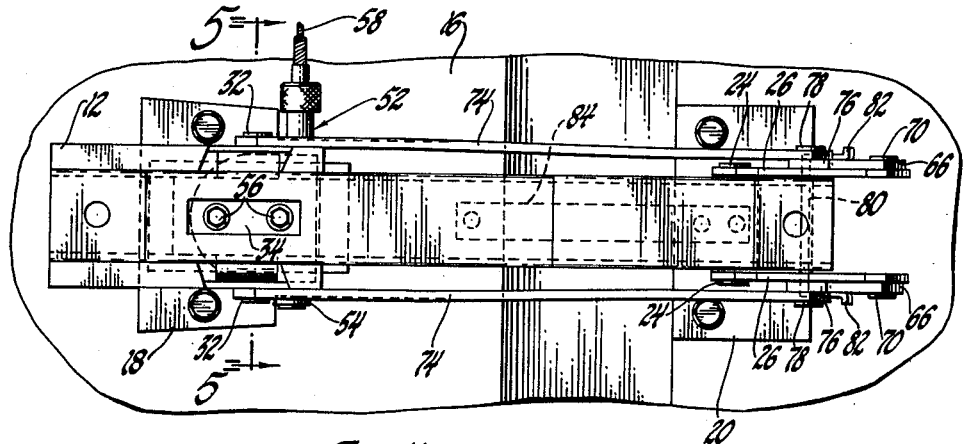
FIGURE 4 is a plan view taken in the direction of the arrows generally along the line 4—4 of FIGURE 1.

Referring now to the drawings, and particularly FIGURES 1 through 3, there is shown a vehicle seat 10 mounted on a frame 12, supported by the unique seat adjuster indicated generally by numeral 14. The seat adjuster 14 is secured to and supported on the vehicle floor 16 by front 18 and rear 20 seat adjuster support members. The support members 18, 20 are secured to the floor 16 by bolts or other suitable means.

The seat adjuster 14 has an upper support member 22 which is secured to the seat frame 12 by rivets or other suitable means. The rear of the seat adjuster 14 is pivotally connected to the frame 12 at rivet 24 by a tie link 26.

Figure 5:
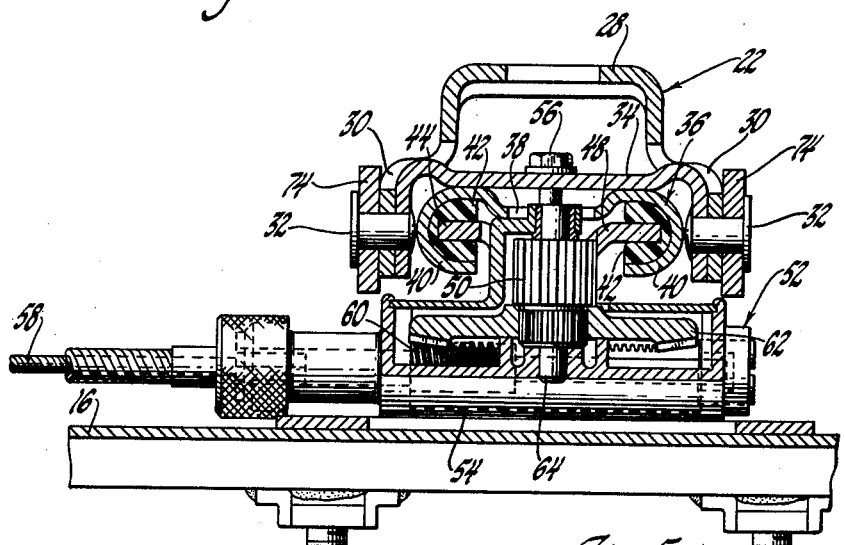
FIGURE 5 is a sectional view of the horizontal drive mechanism in the direction of the arrows taken substantially along the lines 5—5 of FIGURE 4.
Figure 6:
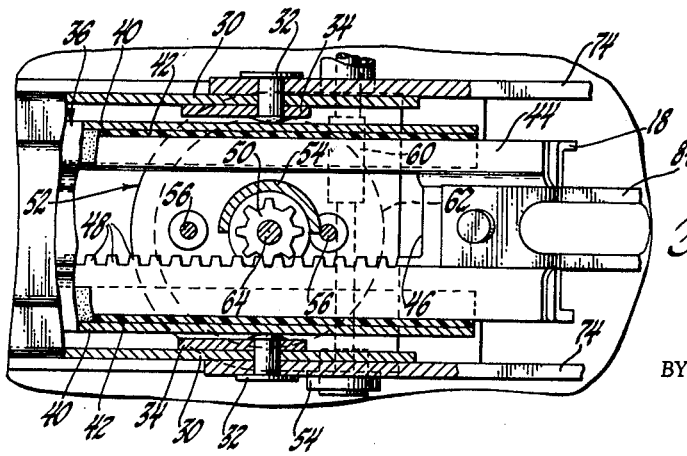
FIGURE 6 is a plan view, partly in section with the parts broken away, showing the rack and pinion horizontal drive mechanism.

As can best be seen in FIGURE 5, the upper support member 22 is generally U shaped having a web section 28 with depending arms 30. The depending arms 30 are pivotally connected by rivet 32 to a plate 34 which is secured to the upper track 36 of the horizontal adjuster. The upper track 36 is an elongated channel generally C shaped in transverse section having a base section 38 merging with outwardly curved walls 40 at each side. The curved walls 40 provide a bearing surface for the anti-friction bearing sludge 42 preferably of nylon which are fixedly mounted to the lower track 44. The lower track 44 is secured by rivets or other suitable means to the front support member 18. The center of the lower track has been removed to form a rectangular opening 46 in which one edge has been notched to form a rack portion 48. In mating engagement with the rack portion 48 is pinion 50 of the horizontal drive unit indicated generally by numeral 52. The horizontal drive unit or actuator 52 which includes housing 54 has portions thereof which pass through the opening 46 and are secured to the upper track 36 and plate 34 by bolts 56 so that the actuator 52 and upper track 36 move as a unit. The actuator 52 is driven by flexible cable 58 which transmits power from a reversible electric motor (not shown). The flexible cable 58 drives a hypoid pinion 60 which is in mating engagement with the hypoid gear 62. Hypoid gear 62 and pinion 50 are keyed to the same shaft 64, which is rotatably supported in housing 54 so that as the hypoid gear is driven by hypoid pinion 60 the pinion 50 will also rotate.

Thus, it can be seen that horizontal actuation of the seat adjuster is accomplished by power transmitted from the electric motor through the flexible cable 58 to the hypoid pinion 60 which drives the hypoid gear 62 and pinion 50. As the pinion 50, in mating engagement with the rack portion 48, rotates the upper track 36 moves relative to the fixed lower track 44. The preferred embodiment is shown in the drawings; however, a conventional manual two-way seat adjuster and lockbar as known in the art could be used to replace the powered horizontal adjuster.

As seen in FIGS. 1, 2 and 3, the tie link 26 which has one of its ends pivotally connected to the rear of the seat frame 12 has the other end pivotally connected to an arm 66 of bellcrank 68 by rivet 70. The fulcrum of bellcrank 68 is pivotally connected to the rear support member 20 by rivet 72. Movement of bellcrank 68 is controlled by connecting link 74 which has one of its ends pivotally connected to the other arm 76 of the bellcrank 68 by rivet 78. The other end of connecting link 74 is pivotally connected to the upper support member 22 and plate 34 by rivet 32. Therefore, as the upper track 36 moves fore and aft, connecting link 74 pivots bellcrank 68 about rivet 72. As the bellcrank 68 pivots about rivet 72, tie link 26 raises or lowers the rear of the seat depending upon the direction the seat is being moved. When the seat is moved to the rear, the rear of the seat is lowered.

A limit bar 80 is attached by rivets or other suitable means to the parallel bellcranks 68. The limit bar 80 contacts the rear support member 20, as seen in FIGURE 1, limiting forward movement of the seat adjuster. The limit bar 80 has an outwardly extending tab 82 which cooperates with the connecting link 74, as seen in FIGURE 3, to limit travel of the seat adjuster to the rear. The front support member 18 and rear support member 20 are connected by a bridging member 84, which is secured to the members by rivets or other suitable means. Bridging member 84 also acts as an anchor for one end of an assist spring 86 which has its other end connected to the mid-section of the limit bar 80.

As can best be seen in FIGURES 1, 2 and 3, in the fully forward position shown in FIGURE 1, the assist spring 86 is compressed and as the seat adjuster moves to the rear, the spring is progressively expanded, as seen in FIGURE 2, until the seat is in the extreme rear position, as seen in FIGURE 3, at which point the assist spring 86 is fully expanded. While the seat is moving to the rear, the back of the seat is being lowered and the weight of the seat and the occupant assist the electric motor to expand the assist spring 86. When the seat is moved forward from the extreme rear position, as seen in FIGURE 3, the weight of the seat and the occupant must be raised and the assist spring aids the electric motor in lifting the increased load, thus, equalizing the load of the motor during fore and aft movement.

As can be seen in FIGURES 1, 2 and 3, as the seat is moved from the fully forward position in FIGURE 1 to the rear position as shown in FIGURE 3, the front edge of the seat moves in a substantially level plane while the rear of the seat is progressively lowered imparting a compound movement to the seat.

While but one embodiment of the invention has been shown and described, it will be evident that numerous changes and modifications may be made. It is, therefore, to be understood that it is not intended to limit the invention to the embodiments shown but only by the scope of the claims which follow.

I claim:
1. A vehicle seat adjuster having a seat frame adapted to support a vehicle seat, a front lower support member, a rear lower support member, said lower support members being adapted to be secured to a vehicle floor, an upper support member supporting one end of said seat frame, a horizontal adjusting means comprising a first track member secured to said front lower support member and a second track member slidably engaging said first track member for supporting said upper support member for movement of said upper support member substantially horizontally fore and aft relative to said lower support members, a linkage means adjustably supporting the other end of said seat frame on said rear lower support member, said linkage means being operatively connected to said horizontal adjusting means for simultaneously raising the other end of said seat frame as said seat frame is moved forward by said horizontal adjusting means and for simultaneously lowering the other end of said seat frame as said seat frame is moved aft by said horizontal adjusting means, and power means operatively associated with said seat adjusted for actuating said horizontal adjusting means.

2. A seat adjuster as claimed in claim 1 wherein said linkage means consists of a bellcrank pivotally connected at its fulcrum to said rear lower support member, a tie link having one end pivotally connected to said seat frame and having its other end pivotally connected to a first arm of said bellcrank, a control link having one end pivotally connected to said upper support member and having its other end pivotally connected to a second arm of said bellcrank, said linkage means being arranged so that as said upper support member moves forward, said control link pivots said bellcrank forwardly about its fulcrum and as said upper support member moves aft said control link pivots said bellcrank rearwardly about its fulcrum and as said bellcrank pivots forwardly said tie link moves said other end of said seat frame away from said lower rear support member and as said bellcrank pivots rearwardly said tie link moves said other end of said seat frame toward said lower rear support member and stop means secured to said bellcrank and positioned thereon for cooperating with said rear lower support member for limiting rotational movement of said bellcrank whereby movement of said seat adjuster is limited.

3. A vehicle seat adjuster comprising a seat frame adapted to support a vehicle seat, a front lower support member, a rear lower support member, said lower support members being adapted to be secured to a vehicle floor, an upper support member secured to and supporting the front of said seat frame, a horizontal adjusting means consisting of a fixed lower track secured to said front lower support member and a mating upper track limited to movement fore and aft relative to said lower track, said upper track being connected to and supporting said upper support member, a linkage means interconnecting the rear of said seat frame and said rear lower support member, said linkage means consisting of a bellcrank pivotally connected at its fulcrum to said rear lower support member, a tie link pivotally connected at one end to the rear of said seat frame and at its other end to a first arm of said bellcrank, a connecting link pivotally connected at one end to a second arm of said bellcrank and at the other end pivotally connected to said upper track, adjustment of said linkage means being controlled by movement of said horizontal adjusting means through said connecting link, the rear of said seat frame being raised and moved forwardly as said upper track moves forwardly and conversely the rear of said seat frame being moved to the rear and lowered as said upper track moves rearwardly, stop means secured to said bellcrank limiting fore and aft adjustment of said seat adjuster, yieldable means biasing said linkage means to rotate forwardly about said bellcrank fulcrum and power means operatively associated with said seat adjuster to actuate said horizontal adjusting means.

4. A vehicle seat adjuster comprising a seat frame adapted to support a vehicle seat, a lower support member adapted to be secured to a vehicle floor, an upper support member supporting one end of said seat frame, a horizontal adjusting means comprising a first track member secured to said lower support member, a second track member slidably engaging said first track member for supporting said upper support member for movement of said upper support member fore and aft relative to said lower support member, a linkage means adjustably supporting the other end of said seat frame on said lower support member, and a connecting link having one end pivotally connected to said linkage means and the other end pivotally connected to said upper support member, said linkage means being responsive to fore and aft movement of said upper support member for simultaneously vertically adjusting the other end of said seat frame.

5. A vehicle seat adjuster comprising a seat frame adapted to support a vehicle seat, a lower support member adapted to be secured to a vehicle floor, an upper support member for supporting one end of said seat frame, a horizontal adjusting means having a first track member secured to said lower support member, a second track member slidably engaging said first track member for supporting said upper support member for fore and aft movement relative to said lower support member, linkage means adjustably supporting the other end of said seat frame on said lower support member, said linkage means including first and second links pivotally connected to said seat frame and to said lower support member, respectively, a pivotal connection connecting said links to each other, and a third control link pivotally connected to one of said first mentioned links and pivotally connected to said upper support member, said control link being movable in response to fore and aft movement of said upper support member for simultaneously moving said first and second links for vertically adjusting the other end of said seat frame.

6. A seat adjuster as set forth in claim 5 including spring means effective upon said linkages to normally bias said linkages to position said seat in a raised position.

7. A seat adjuster as set forth in claim 5 including a stop member carried by one of said links for limiting the range of fore and aft movement of said seat adjuster.

References Cited in the file of this patent
UNITED STATES PATENTS

| | | |
|---|---|---|
| 2,791,263 | Chayne | May 7, 1957 |
| 2,809,688 | Brundage | Oct. 15, 1957 |
| 2,942,646 | Himka et al. | June 28, 1960 |
| 2,983,307 | Meyer | May 9, 1961 |

UNITED STATES PATENT OFFICE
CERTIFICATE OF CORRECTION

Patent No. 3,167,297            January 26, 1965

Thomas E. Lohr

It is hereby certified that error appears in the above numbered patent requiring correction and that the said Letters Patent should read as corrected below.

Column 2, line 3, for "sludge" read -- slugs --; column 3, line 42, for "adjusted" read -- adjuster --.

Signed and sealed this 6th day of July 1965.

(SEAL)
Attest:

ERNEST W. SWIDER            EDWARD J. BRENNER
Attesting Officer            Commissioner of Patents